(12) United States Patent
Pereira et al.

(10) Patent No.: US 8,777,155 B2
(45) Date of Patent: Jul. 15, 2014

(54) ELECTRIC POWER SUPPLY CIRCUIT FOR A TURBOJET ENGINE NACELLE

(75) Inventors: David Pereira, Limours (FR); Hakim Maalioune, Orgeval (FR); Vincent Le Coq, St Romain de Colbosc (FR)

(73) Assignee: Aircelle, Gonfreville l'Orcher (FR)

( * ) Notice: Subject to any disclaimer, the term of this patent is extended or adjusted under 35 U.S.C. 154(b) by 164 days.

(21) Appl. No.: 13/384,807

(22) PCT Filed: Jun. 29, 2010

(86) PCT No.: PCT/FR2010/051352
§ 371 (c)(1),
(2), (4) Date: Jan. 19, 2012

(87) PCT Pub. No.: WO2011/010033
PCT Pub. Date: Jan. 27, 2011

(65) Prior Publication Data
US 2013/0119664 A1   May 16, 2013

(30) Foreign Application Priority Data
Jul. 24, 2009  (FR) ..................... 09 03662

(51) Int. Cl.
B64D 41/00  (2006.01)
(52) U.S. Cl.
USPC ........................................................ 244/58
(58) Field of Classification Search
USPC ..... 244/58, 134 R, 134 D, 110 B; 60/39.093; 416/95; 307/9.1; 219/202
See application file for complete search history.

(56) References Cited

U.S. PATENT DOCUMENTS

| 5,114,103 | A  | * | 5/1992  | Coffinberry ................... 244/209 |
| 5,867,979 | A  | * | 2/1999  | Newton et al. ................ 60/226.1 |
| 6,992,403 | B1 | * | 1/2006  | Raad ............................... 307/47 |
| 7,482,709 | B2 | * | 1/2009  | Berenger ........................ 307/45 |
| 7,538,521 | B2 | * | 5/2009  | Berenger ........................ 322/25 |
| 7,936,082 | B2 | * | 5/2011  | Boudyaf et al. ............... 307/9.1 |
| 8,169,100 | B2 | * | 5/2012  | Dooley ........................... 290/46 |
| 2007/0257558 | A1 | * | 11/2007 | Berenger ..................... 307/10.1 |
| 2007/0259545 | A1 | * | 11/2007 | Berenger ..................... 439/135 |

FOREIGN PATENT DOCUMENTS

| DE | 102007057536 A1 | 6/2009 |
| EP | 1852953 A1 | 11/2007 |
| FR | 2911847 A1 | 8/2008 |

OTHER PUBLICATIONS

International Search Report issued Sep. 27, 2010 by European Patent Office re: PCT/FR2010/051352: citing: EP 1 852 953 A1, FR 2 911 847 A1 and DE 10 2007 057536 A1.

* cited by examiner

*Primary Examiner* — Philip J Bonzell
(74) *Attorney, Agent, or Firm* — Brinks Gilson & Lione

(57) ABSTRACT

The present invention relates to an electric power supply circuit (1) for a turbojet engine nacelle including at least one electric generator (2) mechanically connected to the shaft of a turbojet engine, said generator being capable of directly supplying electric power to a first electric power device other than a simple monitoring or supervising unit, characterized in that said generator is capable of directly supplying electric power to at least one second electric power device other than a monitoring or supervising unit, as well as to a nacelle including such an electric circuit.

17 Claims, 1 Drawing Sheet

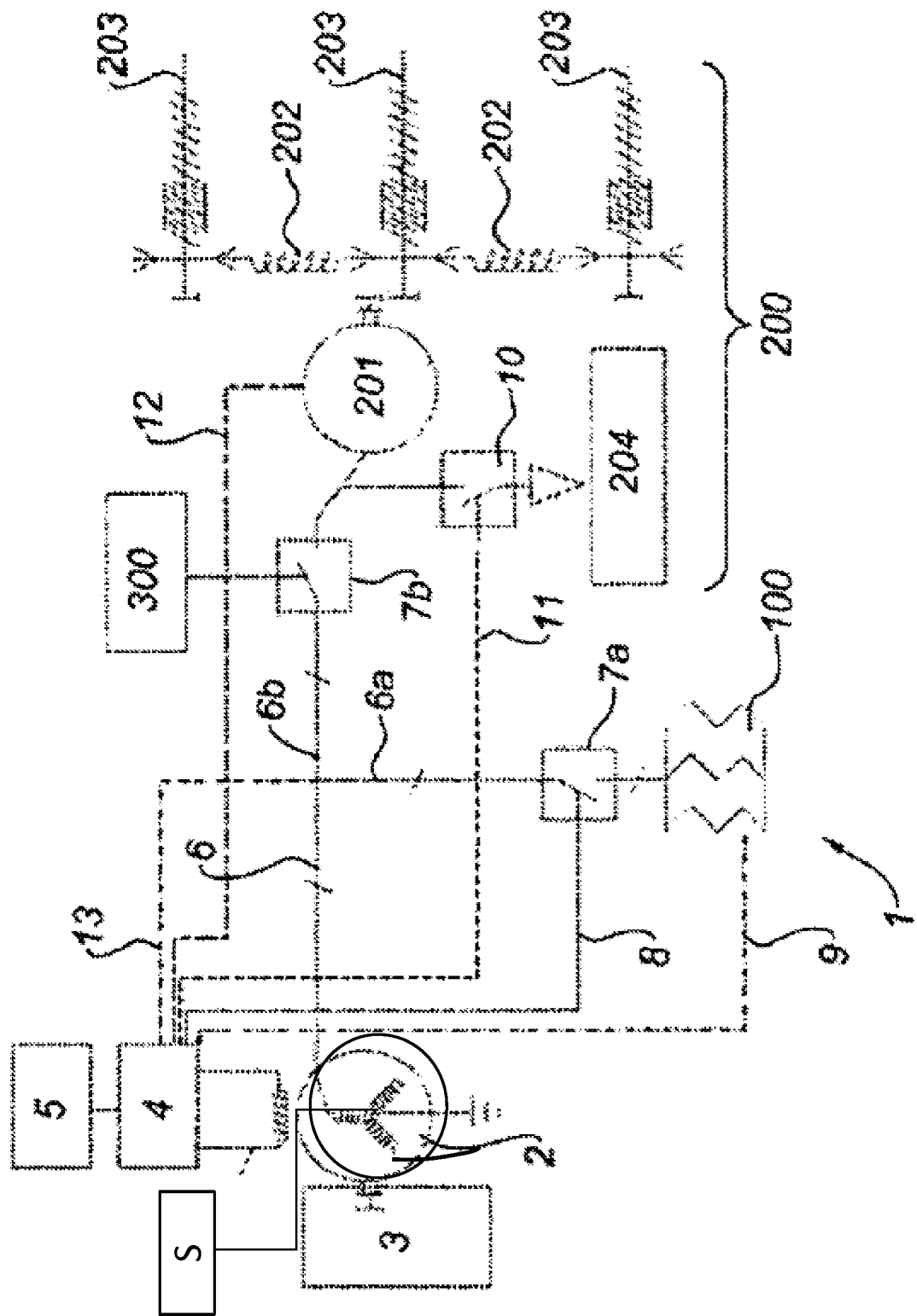

ELECTRIC POWER SUPPLY CIRCUIT FOR A TURBOJET ENGINE NACELLE

TECHNICAL FIELD

The present invention relates to an electric power supply system for a turbojet engine nacelle.

BRIEF DISCUSSION OF RELATED ART

An airplane is propelled by several turbojet engines each housed in a nacelle also housing a set of complementary devices related to its operation, such as a thrust reverser device and a deicing system, for example.

The role of a thrust reverser during landing of an airplane is to improve its braking capacity by reorienting at least part of the thrust generated by the turbojet engine forward.

In that phase, the reverser obstructs the gas jet nozzle and orients the jet flow from the engine toward the front of the nacelle, thereby generating a counter-thrust that is added to the braking of the airplane's wheels.

The means implemented to perform this reorientation of the flow vary depending on the type of reverser. However, in all cases, the structure of a reverser comprises mobile cowls that can be moved between a deployed position in which they open, in the nacelle, a passage intended for the deflected flows, on the one hand, and a retracted position in which they close that passage, on the other.

These mobile cowls can themselves perform the deflection function or more simply a function of activating other deflection means such as flaps obstructing the stream.

Generally, the mobile cowls and deflection means are actuated by hydraulic or pneumatic cylinders that require a network for conveying a pressurized fluid. This pressurized fluid can be obtained by air bleed on the turbojet engine in the case of a pneumatic system or withdrawal on the airplane's hydraulic circuit in the case of a hydraulic system.

Such systems require significant maintenance because the smallest leak in the hydraulic or pneumatic network can be harmful consequences both on the reverser and on other parts of the nacelle. Furthermore, due to the reduced space available in the front frame of the reverser, the placement and protection of such a circuit are particularly delicate and bulky.

To offset these various drawbacks related to the pneumatic and hydraulic systems, the builders of thrust reversers have sought to replace them and maximally equip their reversers with lighter and more reliable electromechanical actuators. Such a reverser is described in document EP 0 843 089.

Other patent applications more particularly target the control systems for these electric reversers.

Another important piece of equipment in a turbojet engine nacelle is the deicing and/or anti-icing system for the leading edges and more particularly for the air intake lip of the engine of the aircraft.

In fact, the formation of ice on the air intake lip poses a number of problems, including the addition of weight, the imbalance that follows between the port and starboard portions, and in the more particular case of turbojet engine air intakes, the formation of blocks of ice that can penetrate the engine and damage the blades of its fan in particular.

Among the deicing systems of the prior art, pneumatic systems are known consisting of taking hot air at the turbojet engine and conveying it to the inside of the air intake lip using a suitable conduit circuit.

These pneumatic systems are bulky, heavy, and deteriorate the output of the aircraft's engines.

As a result, as for the thrust reverser system, aeronautics builders have sought to use electric deicing systems using an array of electric resistance heaters through which an electric current circulates.

Furthermore, many patent documents target these systems. These in particular include applications FR 08/06416 and FR 09/00364, which are not yet published.

One important aspect of these turbojet engine nacelles using electric systems is the management of the electric power for those different systems.

Document EP 1 953 085 deals with this question and relates to a power circuit for an electric deicing system.

According to document EP 1 953 085, the deicing system is powered via a dedicated electric generator distinct from the generators making it possible to provide electric power for the airplane to which the thrust reverser device in particular will be connected. This dedicated generator is more particularly mounted on the accessory gear box (AGB) of the turbojet engine.

This dedicated generator delivers a regulated electric voltage to the heating resistances of the deicing device of the air intake.

The solution described in document EP 1 953 085 made it possible to do away with a power converter to improve the reliability of the system and avoid providing high-power electric energy in return from the electric core of the airplane to the engine.

The electric activation system of the thrust reverser remains powered by the electric core of the airplane. This system generally consists of converting the electric energy coming from the airplane core by steering a motor connected to a flexible transmission mechanism driving electromechanical actuators.

Although it allows independent management of the electric power supply of the deicing device and makes it possible to avoid the presence of additional electric elements onboard the nacelle, the system described in document EP 1 953 085 has certain limitations.

In fact, in that device, the electric system of the thrust reverser remains connected to the electric core of the airplane. It converts the electric energy from the airplane into alternating voltage, in particular by bridge rectifiers and capacitors in a HVDC-type network.

The system also comprises a set of inverters and regulates the phase currents at one or more motors, for example of the brushless type, able to drive the electromechanical actuators of the thrust reverser device.

These high-power converters remain bulky, making the overall electrical system of the nacelle heavier in particular because their power density of several kW/Kg is limited by the junction temperatures of the silicon substrates for the active transistors such as the IGBT (insulated-gate bipolar transistors).

Furthermore, it will be noted that the electrodynamic braking of the actuators is done by dissipation of the energy generated in the engines through a dissipation resistance by steering a corresponding control transistor, so as to avoid disrupting the airplane's electric network by reinjecting electric energy into it.

Overall, the major drawbacks for energy management are primarily:
the need to provide airplane electrical energy to the system in return, the airplane electrical energy itself being produced from electric generators mounted on the accessory gear boxes of the engine AGB,
the need to convert and regulate the alternating current electric power source, the need to dissipate energy in the electrodynamic braking modes of the reverser (dissipation in a braking resistance) so as not to disturb the quality of the airplane's electric network by reinjecting braking energy into it.

This imposes a number of constraints on the sizing of the system in volume, weight and price, in particular.

BRIEF SUMMARY

The present invention aims to offset these drawbacks and to that end comprises an electric power supply circuit for a turbojet engine nacelle, comprising at least one electric generator mechanically connected to a shaft of the turbojet engine, said generator being capable of directly supplying electric power to a first electric power device other than a simple monitoring or supervising unit, characterized in that said generator is capable of directly supplying electric power to at least one second electric power device other than a monitoring or supervising unit.

"Directly" means without passing through the airplane network, i.e. the electric generator does not power the electric network of the airplane from which the electric energy will then be taken to power the first and second active electric devices, but that the power supply is done directly within the nacelle by said dedicated generator. This does not prevent a passage of the electric power supply through different members, such as rectifiers, transistors or others, but remains internal to the nacelle.

The expression "electric power device other than a monitoring or supervising unit" does not prevent the electric device from containing a monitoring or supervising unit specifically for managing those active components such as the heating resistances and/or electric motors. Thus, such devices in particular comprise a thrust reverser device, an electric deicing device, a variable nozzle device, but exclude a simple monitoring or supervision unit alone.

Thus, by using a same independent generator to power several pieces of electric power supply equipment of the nacelle, it is no longer necessary to take energy from the electric network of the airplane or to correct and rectify it. This results in simplifying the circuit, reducing components and consequently lightening the structure.

Preferably, one of the electric power supply devices is an electric deicing device.

Also advantageously, one of the electric power supply devices is a thrust reverser device. Also advantageously, the thrust reverser device comprises an electrodynamic braking output line able to at least partially power another electric device.

Generally, mutualizing the electric source between an electric device of the deicing type and an electric device of the thrust reverser type is allowed by the fact that an interruption of several seconds of the deicing device can be allowed. During this interruption, the generator is then used to power the thrust reverser device, the opening and retracting time of which is several seconds.

The power level taken and dissipated in electrodynamic braking is also lower than the maximum deicing power. The sizing of the generator for the deicing system is therefore also suitable for the thrust reverser device.

In the case of a thrust reverser system with a single electric motor, it is possible to imagine, rather than using AC-AC or AC-AD and DC-AC converters, directly steering the generator and powering the electric motor of the thrust reverser device, for example of the direct current type, without a converter.

Advantageously, one of the electric power devices is a variable nozzle device.

According to one embodiment, the electric generator is of the generator/starter type.

Advantageously, the electric generator in starter mode can be powered by a return line of one of the electric devices.

In fact, the rejection of the energy in braking mode can be done either, if the sizing allows it, in the shaft of the generator (starter operation), or to power the other electric device, in this case more particularly the deicing device. The rejection of the energy can be mixed, which makes it possible to monitor the braking speed.

Preferably, the generator is situated at an accessory gear box of the turbojet engine.

Preferably, the electric power supply circuit comprises at least two electric generators, in particular for safety reasons.

According to one embodiment, at least one of the power devices operates in direct current, in particular owing to at least one direct current motor.

Preferably, at least one electric device is associated with a converter, in particular of the AC-AC type when the power device operates in direct current. This may in particular involve a thrust reverser device with a direct current electric motor.

Advantageously, the converter makes it possible to steer the associated electric device, in particular by regulating the power supply of the device, in particular via a nacelle monitoring and/or airplane monitoring unit.

Also advantageously, the generator is steered by at least one electric monitoring unit of the nacelle. The steering of the generator can in particular be used to directly steer the associated electric device(s).

In a complementary manner, the generator is steered by at least one electric monitoring unit of the nacelle. Such a unit is generally known under the acronym ENU (Electrical Nacelle Unit).

Advantageously, the electric generator can be steered using supervisory signals coming from the first and/or second powered electric devices, in particular via the monitoring unit of the nacelle.

Preferably, the circuit includes at least one electric switch that can be controlled by a monitoring unit, in particular an airplane monitoring unit.

Advantageously, with the solution according to the invention, there is no longer a primary power converter, or a withdrawal of electric power supply source on the airplane network, but only a set of switches that make it possible to orient the voltage from the generator toward one and/or the other controlled electric device.

Another embodiment may be proposed in the case where the response time for the voltage regulation of the generator is too significant and becomes incompatible with the dynamic regulation needs of the powered electric device. In that case, one can then implement a primary regulation of the voltage of the generator done by a nacelle monitoring unit and provide a secondary voltage converter, also monitored by the nacelle monitoring unit, and used to refine the regulation of the power supply of the electric device as needed and ensure the stability of the control loop.

Advantageously, each electric device powered by the generator is associated with a steerable switch.

In the previous case where a secondary converter is used, the secondary converter can for example be of the AC-AC type and can replace the power supply switch of the electric device.

Preferably, at least one powered electric device comprises at least one control line coming from an airplane monitoring unit.

In fact, the steering aspect of these devices generally remains under the control of the control cabin, and is therefore controlled by an airplane monitoring unit and an engine computer, only the electric power being supplied and managed by the nacelle according to the invention.

The present invention also relates to a turbojet engine nacelle comprising at least one electric power supply circuit according to the invention.

The present invention will be better understood using the following detailed description in light of the appended drawing, in which the sole figure is a diagrammatic illustration of an electric power supply circuit according to the invention.

Before describing in particular the embodiment shown in the sole figure, it is important to specify that the circuit described is not limited to a particular type of electric device, or in particular to a particular deicing device or a particular thrust reverser device, the present invention covering the electric power supply for those systems.

The arrangement and the specificities of these systems are known by those skilled in the art and are not the subject-matter of this application.

BRIEF DESCRIPTION OF THE DRAWING

The sole FIGURE shows an electric circuit in one exemplary embodiment of the invention.

DETAILED DESCRIPTION

The electric circuit 1 according to the invention as shown in the sole FIGURE aims to power, on the one hand, an electric deicing device 100 and, on the other hand, a thrust reverser device 200 comprising an electric motor 201 able to mechanically drive a set of flexshafts 202 actuating a set of electromechanical actuators 203 of the thrust reverser.

The thrust reverser device also comprises a set of bolts 204, in particular called primary and tertiary.

For a more precise description of an electric thrust reverser system, see document EP 0 843 089.

According to the invention, the electric circuit 1 comprises a generator/starter 2 mechanically connected to a shaft "S" of the turbojet engine that rotates it to generate electricity.

This generator is situated at an accessory gear box (AGB) 3 of the nacelle.

One or two other distinct generators (not shown) are charged to supply electricity to the airplane electric network.

The generator 2 supplies electricity for and is steered by a nacelle monitoring unit 4 called ENU (Electrical Nacelle Unit), which in turn is steered by an engine controller 5 called EEC (Engine Electrical Controller). The ENU being a monitoring unit and not a power unit, it is not considered an active electric device according to the invention.

The generator 2 directly powers, via its electric output 6, on the one hand, the deicing device 100 by a feed line 6a, and on the other hand, the thrust reverser device by a line 6b.

In order to orient the electric power supply of the generator 2 as desired either toward the deicing device 100 or toward the thrust reverser device 200, each of the lines 6a, 6b is equipped with a switch 7a, 7b that can allow or interrupt the power supply on the considered line.

The management of the deicing device being independent and generally pertaining to the nacelle, the switch 7a is controlled by a line 8 coming from the ENU 4. A return line 9, typically for the information coming from the temperature sensors, makes it possible to return information to the ENU 4.

The power supply 6b intended for the thrust reverser benefits from double monitoring.

The primary switch 7b is steered by an engine monitoring unit 300, called EIU (Engine Interface Unit).

The power supply 7b directly powers the motor 201 and can power the set of bolts 204 on the condition that a switch 10 is closed controlled by a control line 11 coming from the ENU 4, for safety reasons (segregation of the orders).

A return line 12, typically for the information coming from position sensors of the reverser, makes it possible to return information to the ENU 4.

It will also be noted that the power supply line 6 can be equipped with a current sensor returning information to the ENU 4 via a line 13.

According to the invention, the generator 2 therefore supplies electricity directly to a first electric device, in this case the deicing system 100, and a second electric device, in this case, the thrust reverser device 200.

The steering and monitoring aspects of each device of course remain the direct, indirect or complementary task of the airplane/nacelle controllers, etc. One primary aspect of the invention is that the management of the nacelle electric power is independent and correctly sized without having to take electric power on the airplane network, power that would need to be rectified and adapted.

Depending on the powered devices and the necessary power, the electric power can be oriented toward either or both of the devices.

In the case of a deicing device and a thrust reverser device, it is possible to suspend the deicing during the few seconds of operation of the reverser, which makes it possible to size the generator 2 only according to the maximum power required between the two devices.

One alternative not shown, but claimed comprises providing an electric return from the motor 201 of the thrust reverser toward the generator 2 in starter mode.

In fact, when the thrust reverser is opened or closed, the motor 201 can be used to electrodynamically brake the actuators 203. The motor 203 therefore produces electricity that can be used to power the deicing device 100, or can be returned to the generator 2 in starter mode and on the shaft of the turbojet engine.

Of course, for certain electric devices or certain configurations of those devices, it may be necessary to have back-up electric power or to have secondary compartments that can always require a current intake from the airplane. The power taken will, however, be secondary and no longer primary.

An additional compartment (not shown) comprises using a secondary electric source of the airplane for ground maintenance operations, i.e. when the turbojet engine is stopped and the generator is therefore not producing current. In that case, this regulated voltage circuit is, for example, converted to gradually power the receivers.

It will also be noted that the electric devices powered independently can include, for example, a variable jet nozzle device, etc.

Although the invention has been described with one particular embodiment, it is of course in no way limited thereto and encompasses all technical equivalents of the means described as well as combinations thereof that fall within the scope of the invention.

The invention claimed is:

1. An electric power supply circuit for a turbojet engine nacelle, comprising:

at least one electric generator mechanically connected to a shaft of the turbojet engine, said generator being internal to the nacelle and directly supplying electric power without passing through an airplane network to a first electric power device other than a simple monitoring or supervising unit;

wherein said generator directly supplies electric power without passing through the airplane network to at least one second electric power device other than a monitoring or supervising unit, and wherein one of the electric power devices is an electric deicing device and the other electric power device is a thrust reverser device.

2. The electric power supply circuit according to claim 1, wherein the thrust reverser device comprises an electrodynamic braking output line able to at least partially power the electric deicing device.

3. The electric power supply circuit according to claim 1, wherein the electric power devices further comprise a variable nozzle device.

4. The electric power supply circuit according to claim 1, wherein the generator is situated at an accessory gear box of the turbojet engine.

5. The electric power supply circuit according to claim 1, further comprising at least two electric generators for safety reasons.

6. The electric power supply circuit according to claim 1, wherein at least one electric power device is associated with a converter, of the AC-AC type.

7. The electric power supply circuit according to claim 1 wherein at least one electric power device comprises at least one control line coming from an airplane monitoring unit.

8. A turbojet engine nacelle, comprising at least one electric power supply circuit according to claim 1.

9. The electric power supply circuit according to claim 1, wherein the electric generator is of a generator/starter type.

10. The electric power supply circuit according to claim 9, wherein the electric generator in a starter mode can be powered by a return line of one of the electric power devices.

11. The electric power supply circuit according to claim 1, wherein at least one of the electric power devices operates in direct current, owing to at least one direct current motor.

12. The electric power supply circuit according to claim 11, wherein a converter makes it possible to steer the associated electric power device by regulating the power supply of the device via a nacelle monitoring and/or airplane monitoring unit.

13. The electric power supply circuit according to claim 12, wherein the generator is steered by at least one electric monitoring unit of the nacelle.

14. The electric power supply circuit according to claim 12, wherein the electric generator can be steered using supervisory signals coming from the first and/or second electric power devices via the monitoring unit of the nacelle.

15. The electric power supply circuit according to claim 1, further comprising at least one electric switch that can be controlled by an airplane monitoring unit.

16. The electric power supply circuit according to claim 15, wherein each electric power device powered by the generator is associated with a steerable switch.

17. A method for controlling an electronic power supply circuit for a turbojet engine nacelle, the method comprising:

directly supplying electric power without passing through an airplane network to a first electric power device other than a simple monitoring or supervising unit by at least one electric generator which is internal to the nacelle and mechanically connected to a shaft of the turbojet engine;

directly supplying electric power without passing through the airplane network to at least one second electric power device other than a monitoring or supervising unit by said generator, wherein one of the electric power devices is an electric deicing device and the other electric power device is a thrust reverser device; and suspending the electric deicing device during a few seconds of operation of the thrust reverser device such that the at least one electric generator is sized according to a maximum power between the electric deicing device and the thrust reverser device.

* * * * *